United States Patent
Pierce

(10) Patent No.: US 6,868,407 B1
(45) Date of Patent: Mar. 15, 2005

(54) POSTAGE SECURITY DEVICE HAVING CRYPTOGRAPHIC KEYS WITH A VARIABLE KEY LENGTH

(75) Inventor: Perry A Pierce, Darien, CT (US)

(73) Assignee: Pitney Bowes Inc., Stamford, CT (US)

( * ) Notice: Subject to any disclaimer, the term of this patent is extended or adjusted under 35 U.S.C. 154(b) by 588 days.

(21) Appl. No.: 09/704,860

(22) Filed: Nov. 2, 2000

(51) Int. Cl.$^7$ .............................................. G06F 17/60
(52) U.S. Cl. ............................. 705/60; 705/50; 705/64
(58) Field of Search ............................... 705/60, 50, 64

(56) References Cited

U.S. PATENT DOCUMENTS

| | | | |
|---|---|---|---|
| 5,144,664 A | 9/1992 | Esserman et al. ............. 380/20 |
| 5,341,427 A | 8/1994 | Hardy et al. .................. 380/21 |
| 5,416,841 A | 5/1995 | Merrick ........................ 380/29 |
| 5,805,701 A | 9/1998 | Ryan, Jr. ...................... 380/21 |
| 5,878,136 A | 3/1999 | Kim et al. ..................... 380/21 |
| 6,005,945 A * | 12/1999 | Whitehouse ................. 380/51 |
| 6,044,350 A | 3/2000 | Weiant, Jr. et al. ............. 705/1 |
| 6,058,384 A * | 5/2000 | Pierce et al. .................. 705/50 |
| 6,240,187 B1 * | 5/2001 | Lewis .......................... 705/71 |
| 6,247,921 B1 * | 6/2001 | Helt ........................... 431/264 |
| 6,411,716 B1 * | 6/2002 | Brickell ...................... 713/180 |
| 6,424,954 B1 * | 7/2002 | Leon ........................... 705/401 |
| 6,466,921 B1 * | 10/2002 | Cordery et al. ............... 705/60 |
| 6,526,391 B1 * | 2/2003 | Cordery et al. ............... 705/60 |
| 6,546,377 B1 * | 4/2003 | Gravell et al. ................ 705/60 |

OTHER PUBLICATIONS

USPS, Information Based Indicia Program (IBIP), "Performance Criterial for Information Based Indicia and security Architecture for Open IBI Postage Evendencing Systems", Feb. 23, 2000.

USPS (Draft), Information Based Indicia Program (IBIP) Open System Postal Security Device (PSD) Specification, Jul. 23, 1997.

\* cited by examiner

*Primary Examiner*—Firmin Backer
(74) *Attorney, Agent, or Firm*—Angelo N. Chaclas; Charles R. Malandra; George M. Macdonald

(57) ABSTRACT

A cryptographic method for providing a level of security by a postage security device, which generates a digital token using a cryptographic key. When it is required to make a key change in order to improve the level of security, the postage security devices replaces the cryptographic key with a new cryptographic key, wherein the new cryptographic key has a key length that is equal to or greater than the replaced cryptographic key. The new cryptographic key can be generated by the postage security device based on a given key length, or selected from a plurality of replacement keys stored in a storage device.

19 Claims, 8 Drawing Sheets

POSTAGE SECURITY DEVICE HAVING CRYPTOGRAPHIC KEYS WITH A VARIABLE KEY LENGTH

TECHNICAL FIELD

The present invention is related generally to a security device having cryptographic keys with a variable key length for encryption applications, and, more particularly, to a postage security device, which is capable of using cryptographic keys with a variable key length to provide an adequate level of security as time progresses.

BACKGROUND OF THE INVENTION

Electronic devices using a cryptographic key for security access are well known. For example, U.S. Pat. No. 6,044,350 discloses a certificate meter with selectable indemnification provisions, wherein the certificate meter has a memory to store a plurality of private encryption keys with different key lengths. These private encryption keys are used to digitally sign a message. With advances in computing, cryptographic keys will most likely be compromised. One way to make the signed message more secure is to use a private key that is extremely large. The larger the private key that is used, the more time-consuming and complex are the computations required to compromise the private key. Unfortunately, as the size of the key increases, the amount of processing time required to generate and verify a digitally signed message also significantly increases. The potentially large increase in processing time is not acceptable, because it decreases the overall efficiency of the certificate meter system.

In general, a certificate meter is used for message verification to ensure that the message is genuine, signed by the sender and has not been altered. When a sender requests that a message be certified, the message is converted into a digitally signed message, which is also known as a digital signature. As it is well known, the message is first converted into a digest by a one-way hash function. The digest is encrypted with the sender's private key into a digital signature. The digital signature is sent to the message recipient, along with a public key certificate and a copy of the original message. In operation, when the sender sends a signed message with a public key certificate attached thereto, the recipient verifies the authenticity of the public key certificate by using the certificate authority's public key, and subsequently verifies that the message sent has not been modified using the sender's public key obtained from the public key certificate. The recipient decrypts the received digital signature using the sender's public key. The recipient also generates a digest of the message sent using the same one-way hash function and compares this digest with the decrypted digital signature for an exact match.

Not all messages require the same level of security. Some messages need to be protected for a significantly longer period of time and have a large monetary value associated with them (e.g. a home mortgage contract). Other messages need to be protected for only a few years and have comparatively little value associated with them (e.g. a college ID). Still other messages occur on a frequency basis, and therefore the time required to process them must be kept to a minimum (e.g. credit card transactions). The additional processing overhead required to provide security for a long period of time is burdensome to the processing equipment and is unwarranted for messages that have only a short life and must be processed quickly.

With the certificate meter, as disclosed in U.S. Pat. No. 6,044,350, the message sender can select the level of security and the amount of indemnification desired for the message to be sent. If the level of security and amount of indemnification desired is low, then a short private key should be sufficient for digitally signing the sender's message. Otherwise, a private key with a greater length should be used. For that purpose, the certificate meter, as disclosed in U.S. Pat. No. 6,044,350, has a memory to store three different cryptographic keys, each with a different key length. Only one key is selected to digitally sign a message, depending on the level of security and the amount of indemnification desired by the sender.

In a postage metering system, a similar encryption process can be used for security purposes. Typically, when a user makes a request to a data center for proof of postage payment for a mailpiece, the user sends a group of standard mailing parameters, such as the user's full address and amount of postage requested, to the data center. After validating the user and the account balance, the data center uses a postage security device (PSD) to issue a digital signature/token based on the provided standard mailing parameters and sends the digital signature to the user's postage meter or printer, so that the user's postage meter or printer can print an indicia on the mailpiece as proof of postage payment. In the process, the PSD uses a cryptographic key to encrypt the standard mailing parameters, possibly along with other security parameters that the data center provides, into the digital signature/token.

With advances in computing, the cryptographic keys that are used to generate the digital signature/token could be compromised and need to be changed. In existing PSDs, a fixed cryptographic key is provided for digital signature/token generation. When it is necessary to change the cryptographic key for security reasons, the PSD must be re-keyed or then be removed from service in order to have a new cryptographic key installed. Alternatively, the PSD is replaced by another PSD having a different cryptographic key. This will interrupt the workflow of a postage metering system.

It is, therefore, advantageous and desirable to provide a method and a system wherein the change of cryptographic keys does not interrupt the workflow of the data center, while a higher level of security can be achieved with the change of cryptographic keys.

SUMMARY OF THE INVENTION

The first aspect of the present invention is to provide a PSD, including a cryptographic key, for generating a digital token with a level of security as proof of postage payment requested by a user who provides mailing parameters to the postage security device, and wherein the digital token is generated based on the provided mailing parameters, in order to allow the user to produce an indicia on a mailpiece based on the digital token. The postage security device comprises:

a receiver capable of receiving a command indicating that the current cryptographic key be replaced; and a mechanism, in response to the command, for acquiring the new cryptographic key to replace the current cryptographic key, wherein the replaced cryptographic key has a first key length and the new cryptographic key has a second key length, which is equal to or greater than the first key length, so as to provide a higher level of security than the level of security associated with the replaced cryptographic key.

The second aspect of the present invention is to provide a cryptographic method for providing a level of security by a PSD in a postage metering system, wherein the PSD is used to generate a digital token using a cryptographic key, wherein the digital token is generated based on mailing parameters provided by a user who makes a request to the PSD for proof of postage payment for a mailpiece, and wherein the digital token allows the user to produce an indicia on the mailpiece as proof of postage payment. The cryptographic method provides an increased level of security as time progresses. The method comprises the steps of:

sending a command to the PSD at a given time indicating that the current cryptographic key be replaced; and acquiring or generating a new cryptographic key to replace the current cryptographic key, wherein the replaced cryptographic key has a first key length and the new cryptographic key has a second key length, which is equal to or greater than the first key length, so as to provide a higher level of security than the level of security associated with the replaced cryptographic key.

The third aspect of the present invention is to provide a postage metering system to allow a user to produce an indicia on a mailpiece as proof of postage payment. The postage metering system includes:

a printing device for printing the indicia; and a PSD operatively connected to a printing device to provide the printing device a token so that the indicia can be produced based on the token, wherein the PSD generates a token based on a plurality of mailing parameters provided by the user, and a cryptographic key having a first key length to provide a level of security, and wherein the cryptographic key can be replaced with a new cryptographic key, having a second key length, which is equal to or greater than the first key length, so as to provide a higher level of security than the level of security associated with the replaced cryptographic key.

The present invention will become apparent upon reading the description taken in conjunction with FIG. 1 through FIG. 4c.

DETAILED DESCRIPTION

Figure 1A:
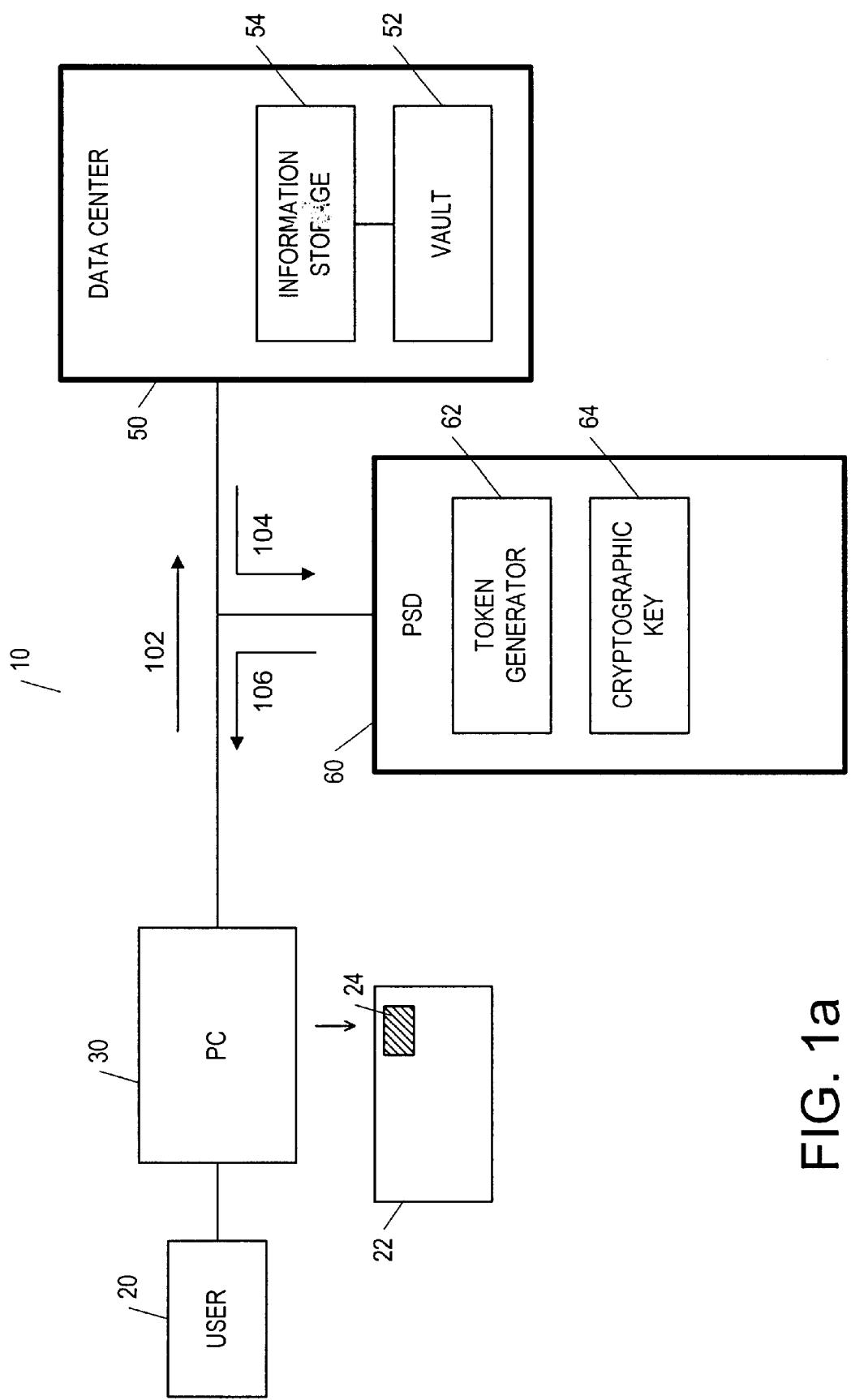
FIGS. 1a and 1b are block diagrams showing the postage metering system, according to the present invention.
Figure 1B:
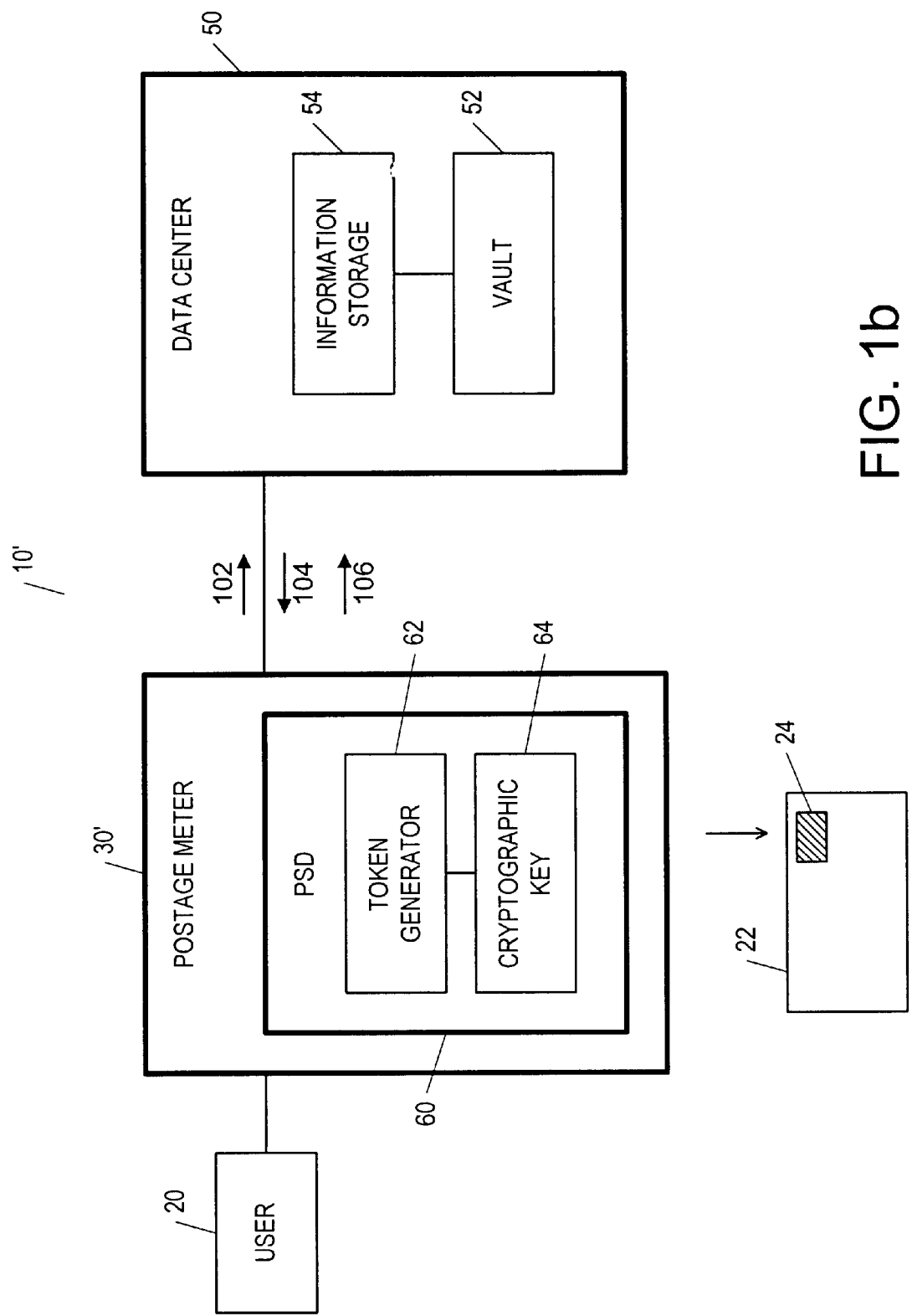

FIGS. 1a and 1b are block diagrams showing the postage metering system. As shown in FIG. 1a, the postage metering system 10 includes a personal computer (PC) 30 connected to a data center 50, which has a vault 52 and an information storage 54. The postage metering system 10 also includes a postage security device (PSD) 60 for handling mail-related security matters. The PSD 60 can be a part of the data center 50 but designated to a user 20, or an independent device issued to the user 20 to be connected to the PC 30. When the user 20 wishes to send a mailpiece 22, the user 20 makes a request to the data center 50 for proof of postage payment for the mailpiece 22. With the request, the user 20 sends along standard mailing parameters 102, such as the user's identification number, full address, and the amount of postage, to the data center 50. Based on the received information 102, the data center 50 uses data stored in the information storage 54 to validate the user and checks the vault 52 for the account balance. The data center 50 then sends mail-related information 104, including the standard mailing parameters 102 provided by the user 20 and possibly other information such as the date and time, to the PSD 60. The PSD 60 uses a cryptographic key 64 to encrypt the mail-related information 104 received from the data center 50 and to generate a digital signature or token 106 using a token generation software 62. The token 106 is sent to the PC 30. Based on the token 106, the PC 30 prints an indicia 24 on the mailpiece 22 as proof of postage payment. As it is well-known in the art, the data center 50 may also send the token to the U.S. Postal Service (USPS, which is not shown) for fraud prevention purposes. It is not currently required to send the token to the USPS.

FIG. 1b is another embodiment of the postage metering system of the present invention. In the postage metering system 10' as shown in FIG. 1b, a postage meter 30' is used, instead of the PC 30, to print the indicia 24 on the mail piece 22. The PSD 60 can be an independent device connected externally to the postage meter 30', or it can be included within the postage meter 30' as shown. Similar to the postage metering system 10 as shown in FIG. 1a, the PSD 60 generates the token 106 using the token generation software 64 with the cryptographic key 62. The token 106 can be sent to the data center 50 upon next communication with the data center 50 for optional reporting of the token to the USPS. At the same time, the postage meter 30' prints the indicia 24 on the mailpiece 22 based on the token 106.

Usually the postage meter 30' or the PSD 60 is locked by the manufacturing facility (see FIGS. 3a and 3b) before it is issued to the user 20 and, therefore, the cryptographic key 62, which is used to generate the token 106, is not known to the user 20 or any other persons who would like to print an indicia. However, as the speed of the computer increases and the knowledge in cryptographic science advances, cryptographic keys are likely to be compromised, given enough time to attack the problem. As discussed in the background section hereinabove, one way to keep the cryptographic key secure is to use a key that is extremely large. The larger the cryptographic key that is used, the more time-consuming and complex are the computations required to compromise the cryptographic key. However, the amount of processing time required to generate a token with a key having an extremely great key length and to verify the authenticity of an indicia based on that token would be burdensome to the processing equipment and drastically decrease the efficiency of the postage metering system 10.

Figure 2A:
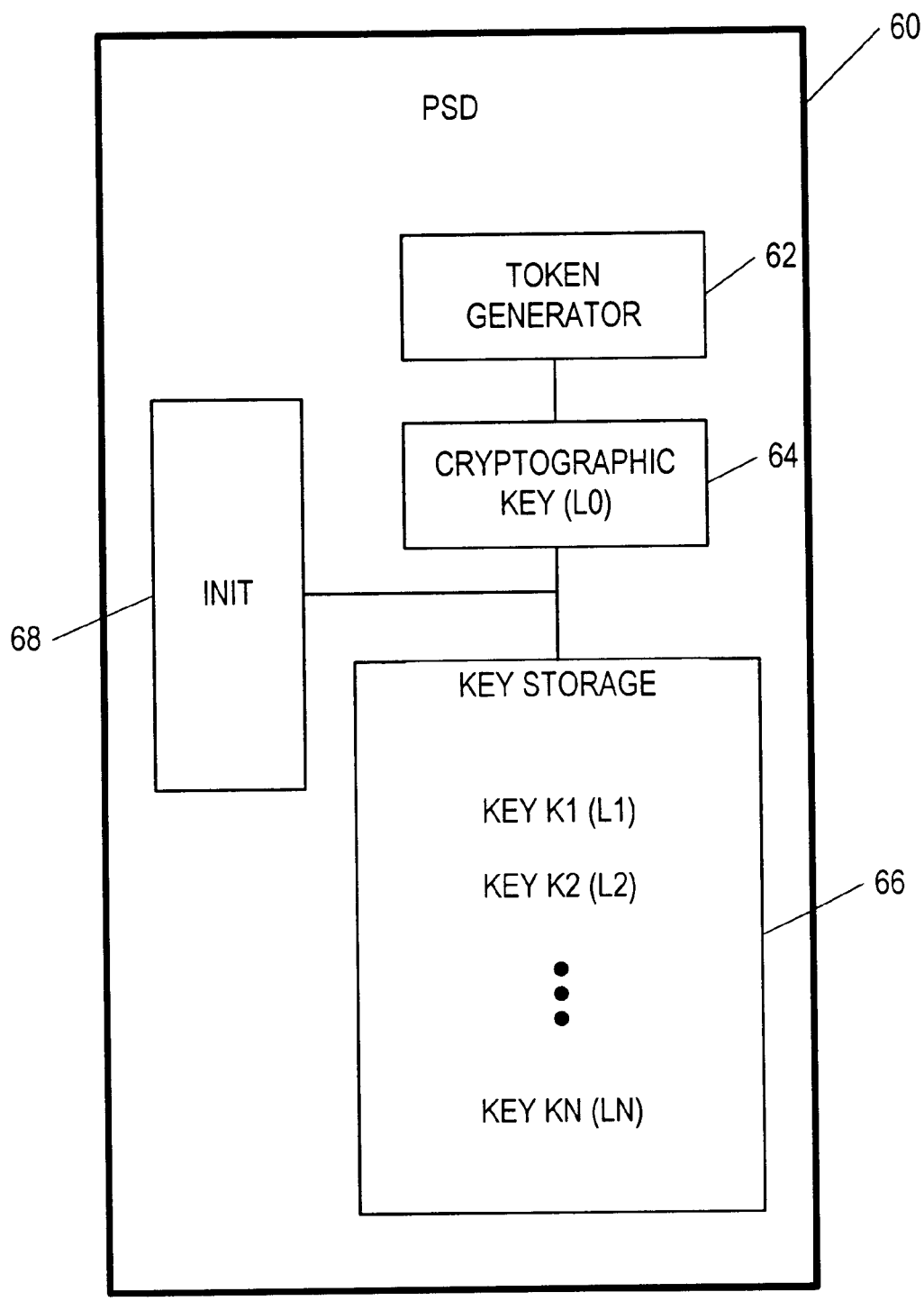
FIGS. 2a and 2b are block diagrams showing the PSD.
Figure 2B:
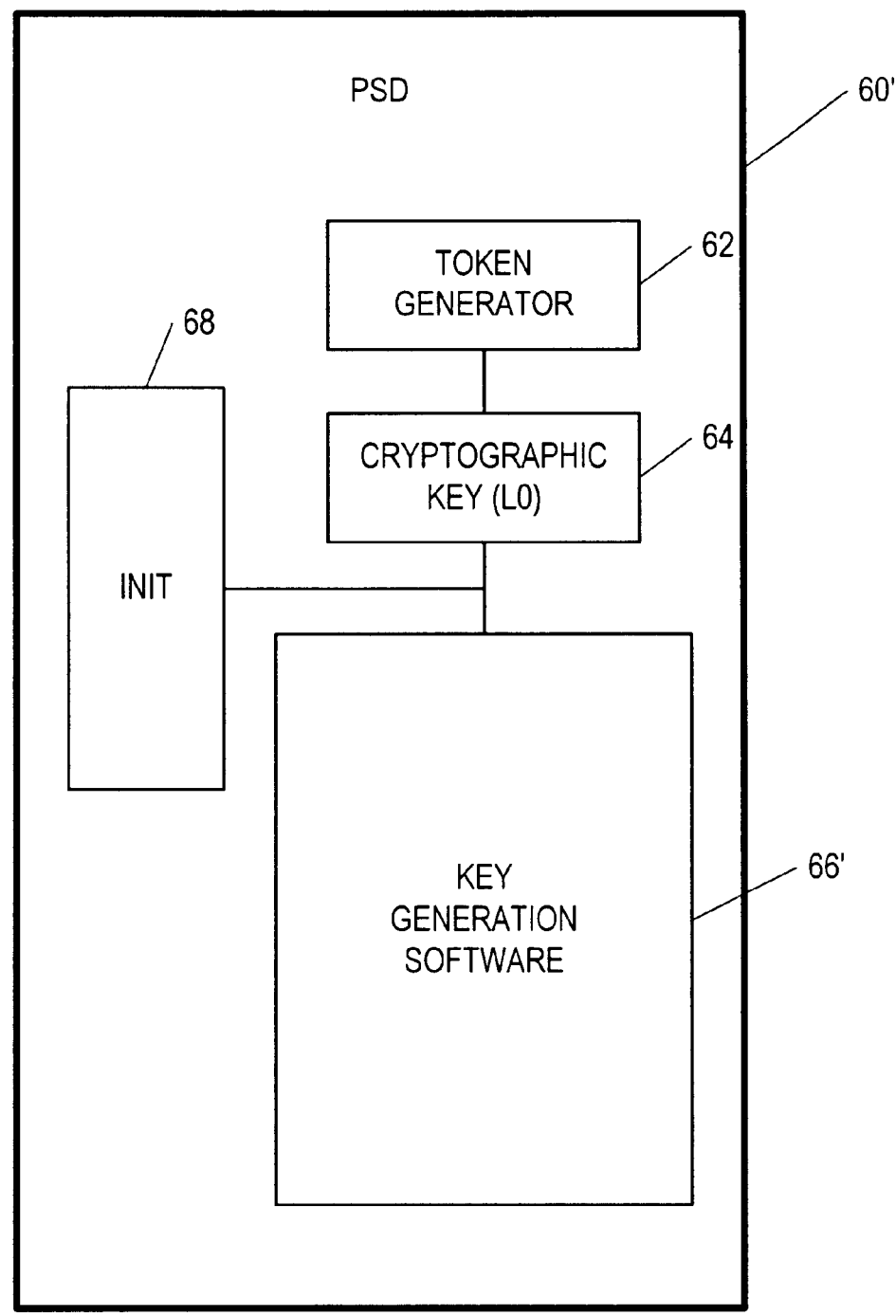

In order to prevent the cryptographic key from being compromised, while keeping the processing overhead at a reasonable level, the present invention provides a PSD, as shown in FIGS. 2a and 2b. As shown in FIG. 2a, the PSD 60 also has a storing area 66 for keeping a plurality of stored cryptographic keys ($K_1$, $K_2$, . . . , $K_n$) in addition to the cryptographic key 64 which is active when the PSD 60 is issued to the user (see FIG. 3a). Preferably, the active cryptographic key 64 has a key length which is reasonably great, so as to prevent the cryptographic key 64 to be compromised, while the processing time required to generate a token and to verify the authenticity of the indicia based on the token remains acceptable. For example, the appropriate key length $L_0$ of the active cryptographic key 64, at the time being, is about 1024. Furthermore, the key lengths ($L_1, L_2, \ldots, L_n$) of the stored cryptographic keys ($K_1, K_2, \ldots, K_n$), respectively, are all different, with $L_0 < L_1 < L_2 < \ldots < L_n$. For example, $L_1=1448$, $L_2=2048$, $L_3=2896$, etc. It is also possible for some m's such that $0>m<n$, $L_{m+1}=L_m$, or the length of the replacement key is equal to the length of the replaced key. The key length of such a replacement key is valid when a key change is due to an expired crypto-period, or due to issuance of a PSD to a new customer, requiring a key change as mandated by the U.S.P.S. Information-Based Indicia Program (IBIP). However, under no circumstance is the length $L_{m+1}$ smaller than the length Lm.

As time progresses, the currently active cryptographic key 64 is likely to be compromised. With the stored cryptographic keys ($K_1, K_2, \ldots, K_n$) available in the PSD 60, a new cryptographic key can be retrieved from the storing area 66 in order to replace the active cryptographic key 64 after the active cryptographic key 64 has been used for a certain period of time. With such change, the active cryptographic key 64 becomes invalid, and the replacement cryptographic key becomes the new active key. It is preferred that when it is time to replace the cryptographic key 64, the stored cryptographic key $K_1$ will be used first, and when it is time to replace the active cryptographic key $K_1$, the stored cryptographic key $K_2$ will be used, and so on. As such, the key lengths of unused keys stored in the storing area 66 are equal to or greater than the key length of the active key currently used by the PSD 60 to generate tokens. Thus, it can be assured that the replacement key is always longer than the replaced key, so that the level of security associated with the replacement key is always higher than the level of security associated with the replaced key. The key lengths of the stored keys ($K_1, K_2, \ldots, K_n$) are chosen with the assumption that by the time the cryptographic key $K_1$ becomes active, its key length $L_1$ will not be burdensome to the postage metering system, because the computing power has increased and the computing technology has advanced correspondingly. As time progresses, the active cryptographic key in the PSD 60 becomes longer and longer, appropriately reflecting the advances in computing.

Figure 3A:
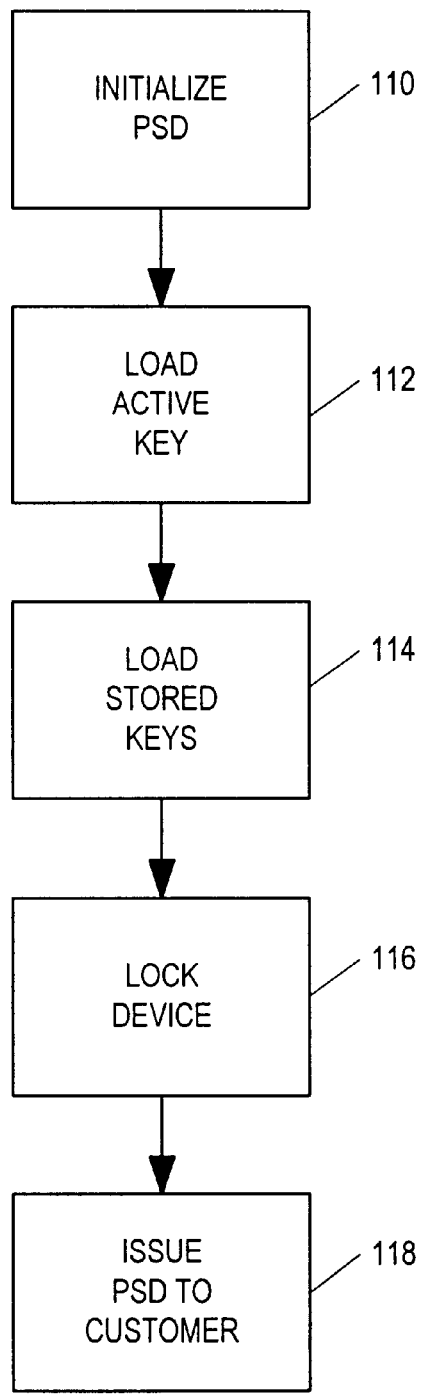
FIGS. 3a and 3b are flow charts showing the process by which the security feature of the PSD is installed.
Figure 3B:
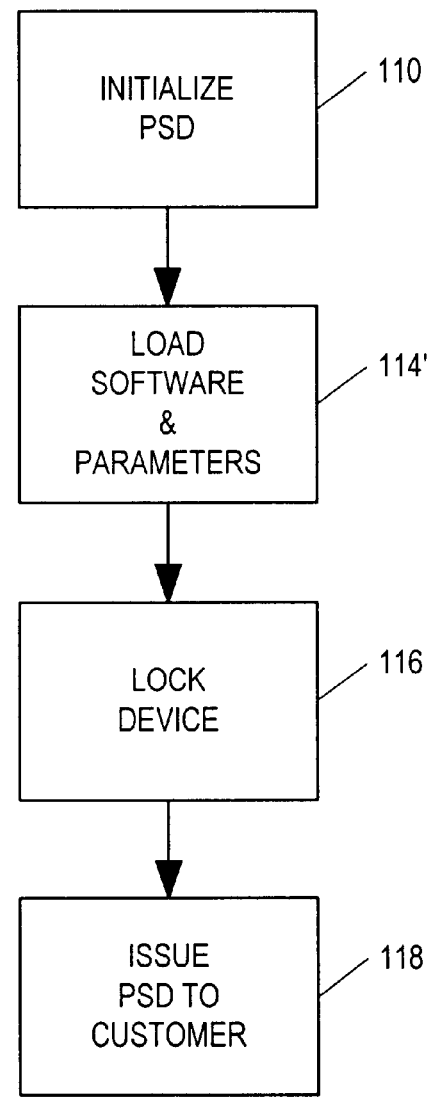
Figure 4A:
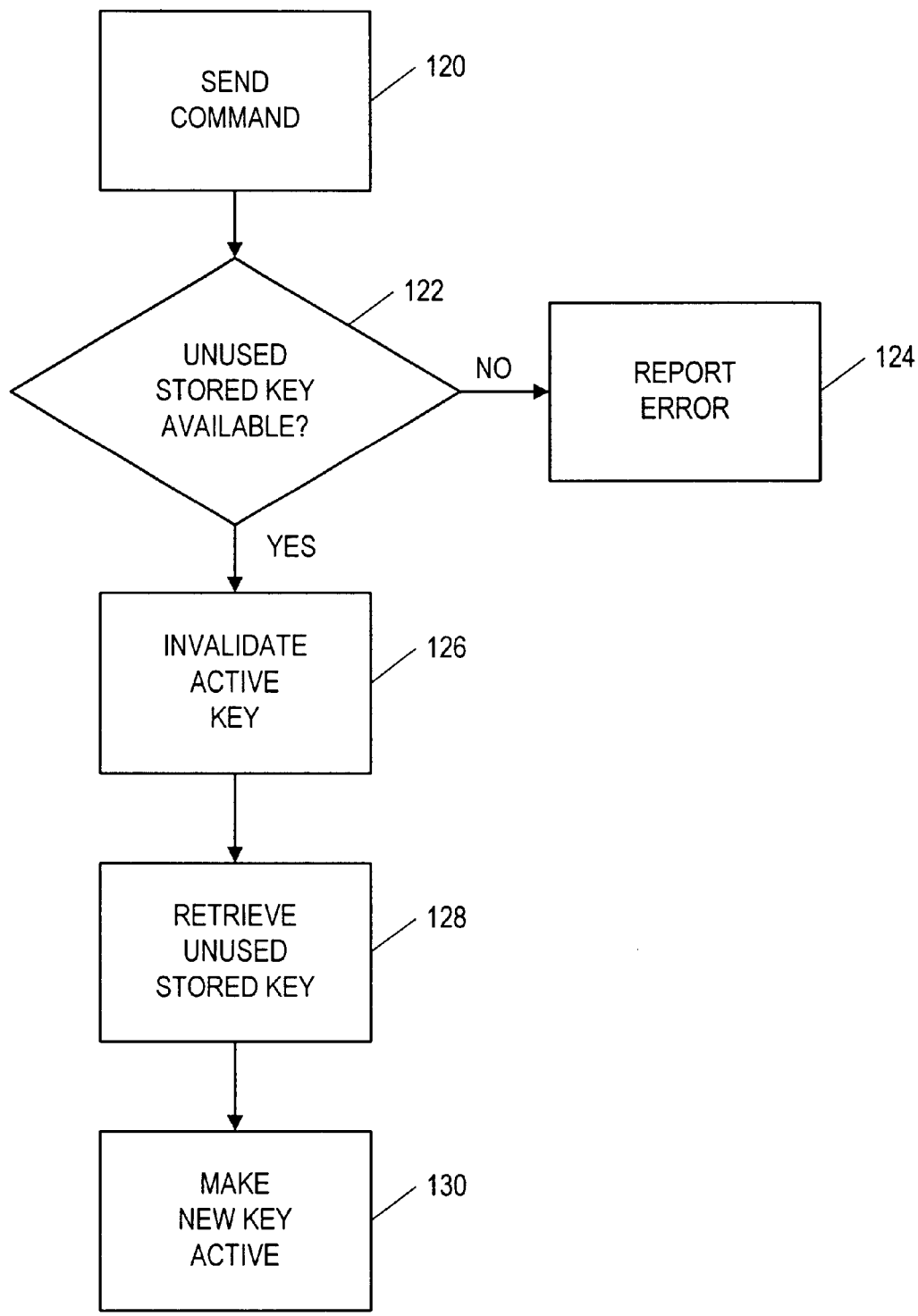
FIGS. 4a, 4b and 4c are flow charts showing the process by which a current cryptographic key is replaced by a new key.
Figure 4B:
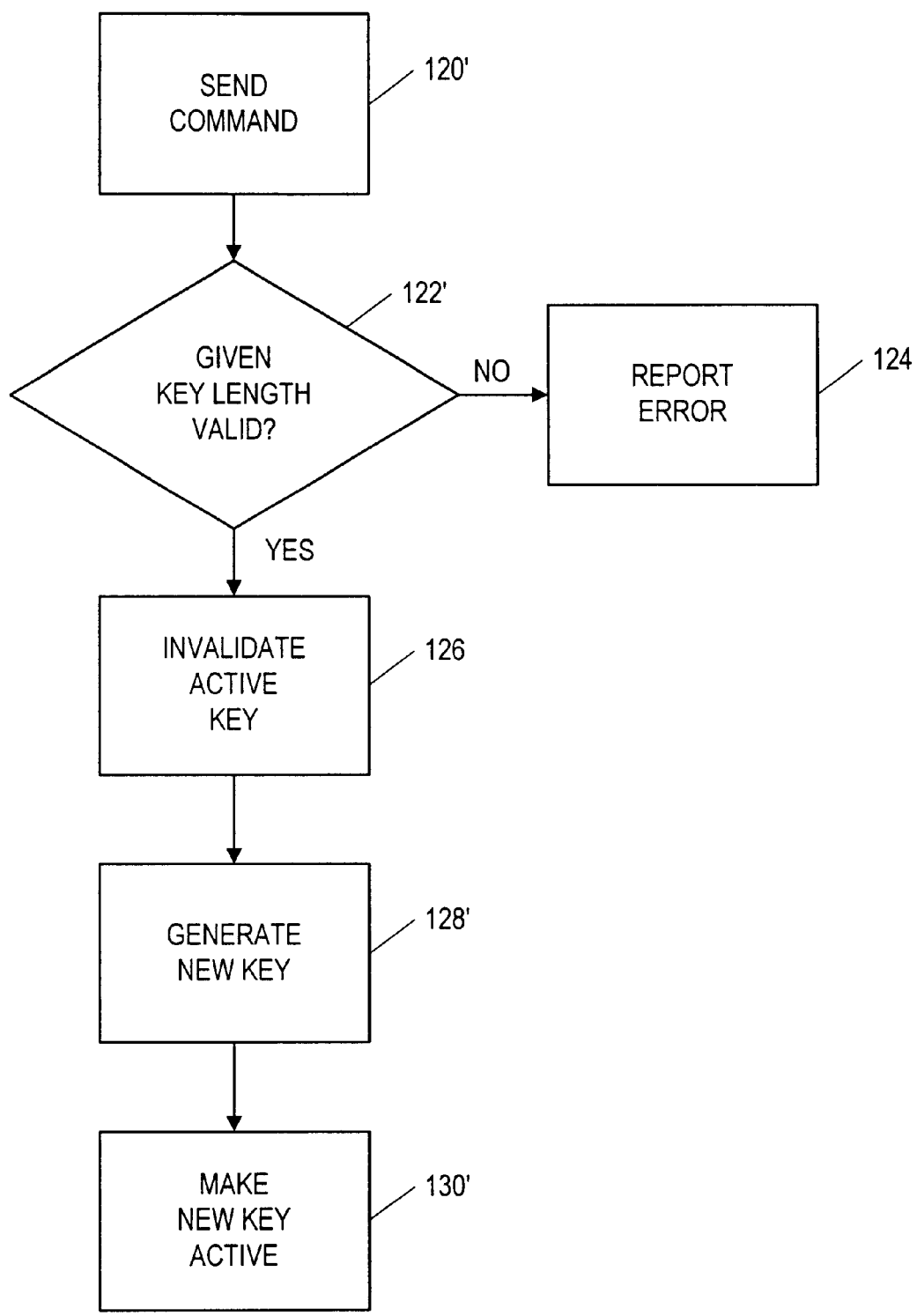
Figure 4C:
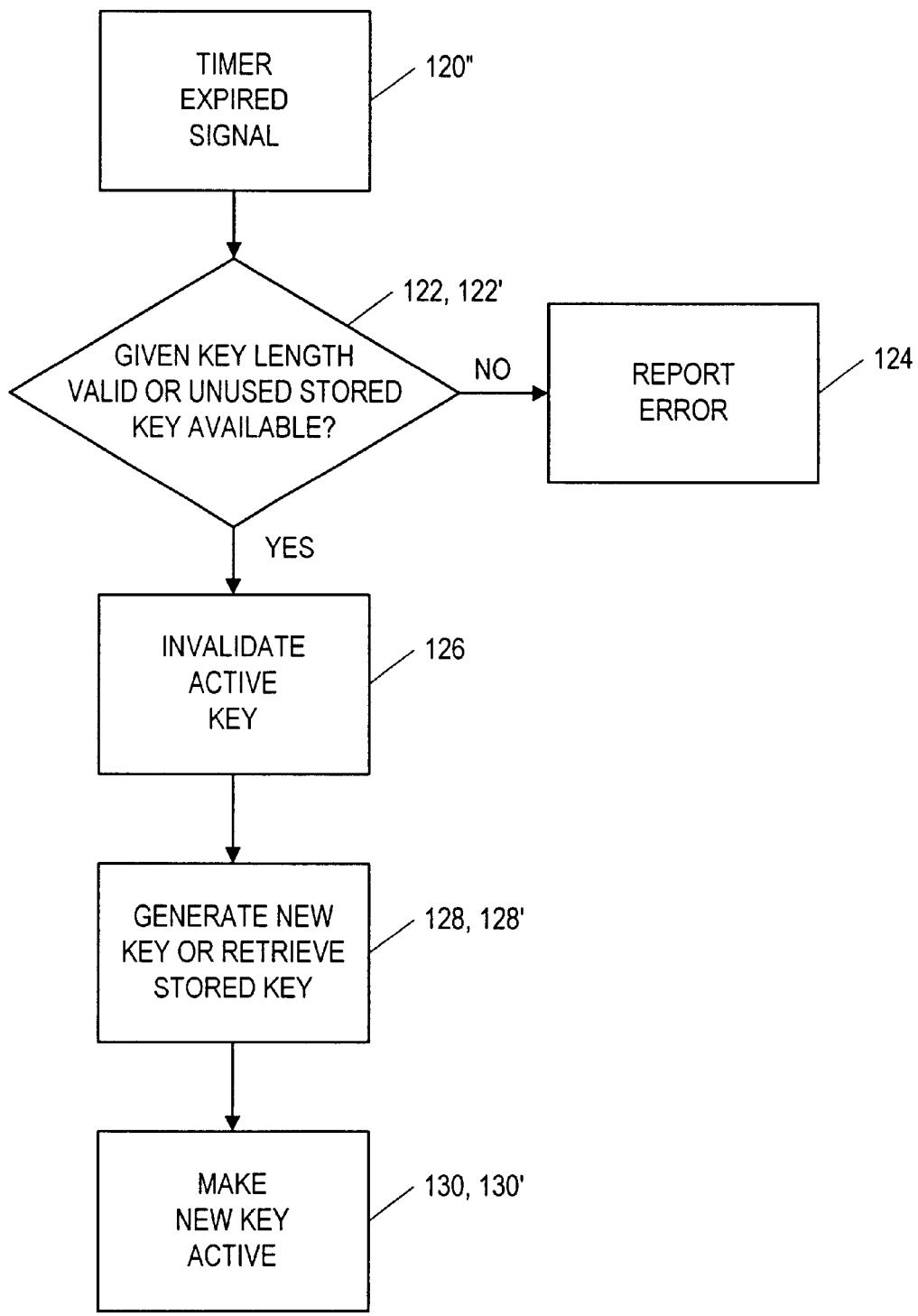

The change of the cryptographic key in the PSD 60 can take place when the data center issues a command to the PSD, as shown in FIGS. 4a and 4b, or it can take place after a set time for the active key has expired, as shown in FIG. 4c. To initiate the change of the cryptographic key in the PSD 60, an initiator mechanism 66 is used to start the process of invalidating the active cryptographic key $K_m$, having a key length $L_m$, retrieving the stored cryptographic key $K_{m+1}$, having a key length $L_{m+1}$, from the storage area 66 and making the retrieved cryptographic $K_{m+1}$ active, as shown in FIGS. 3a and 3b. The initiator mechanism 66 is adapted to receive a command from the data center 50 to change the cryptographic key, or it is adapted to start the key changing process when the expiration date of the active cryptographic key is reached. In the latter case, each cryptographic key in the PSD 60 is associated with an expiration date when the keys (64, $K_1, K_2, \ldots, K_n$) are loaded in the manufacturing process.

FIG. 2b shows a different embodiment of the PSD 60' from the PSD 60 shown in FIG. 3a. Instead of having a key storage area 66 loaded with a plurality of stored cryptographic keys ($K_1, K_2, \ldots, K_n$), the PSD 60' has a key generation software 66' for generating a new cryptographic key with a given key length. The key length for the new key can be stored in the PSD 60' and retrieved by the initiator mechanism 68, or it can be provided by the data center 50 when the data center 50 sends a command to make a key change.

FIG. 3a is a flow chart showing the process by which the security features are implemented in the PSD 60 (FIG. 2a) at a manufacturing facility. As shown in FIG. 3a, the PSD 60 is initialized at step 110. Typically, initialization is performed by hooking a PSD up to a computer where the PSD is "personalized". This involves the loading, from the computer to the PSD, of device parameters such as maximum register values, PSD serial number, and other device specific information that allows the PSD to operate independently. The cryptographic key 64 for immediate use is loaded into the PSD 60 at step 112, and the stored cryptographic keys ($K_1, K_2, \ldots, K_n$) are loaded into the key storage area 66 at step 114. The PSD 60 is locked to prevent tempering at step 116 before it is issued to the user at step 118. The process by which the security features of the PSD 60', as shown in FIG. 2b, are implemented is shown in FIG. 3b. As shown in FIG. 3b, the key generation software 66' and related parameters are loaded into the PSD 60' at step 114' so that the cryptographic keys ($K_1, K_2, \ldots, K_n$) can be generated in the future. However, the loading at step 112 of FIG. 3a is not needed.

FIGS. 4a through 4c are flow charts showing the procedure to substitute a new key for the currently active key. As shown in FIG. 4a, when the active cryptographic key needs to be replaced, a command is given by the data center 50 to the PSD 60 at step 120. The PSD 60 checks the key storage area 66 (see FIG. 2a) to determine whether any unused stored keys are still available at step 122. If no stored key is available, then an error is reported to the data center 50 at step 124. If an unused stored key is available for replacing the active key currently used for encryption, then the PSD 60 invalidates the active key at step 126 and retrieves a new key from the key storage area 66 at step 128. Finally, the newly retrieved key is made active at step 130.

With the PSD 60', as shown in FIG. 2b, new keys are not stored but are generated by a key generation software 66'. Thus, when the active cryptographic key needs to be replaced, a command message, including a new key length, is provided to the PSD 60' at step 120', as shown in FIG. 4b. The PSD 60' checks the given new key length to make sure that the new key length is equal to or greater than the key length of the active key at step 122'. If the new key length is valid, then the PSD 66' invalidates the active key at step 126 and generates a new key based on the given new key length at step 128'. At step 130', the newly generated key is made active.

Alternatively, the replacement of the active cryptographic key occurs when the preset time for the active key has expired. At that time, a signal indicating the expiration of the active key is provided in step 120", as shown in FIG. 4c. The remaining steps for the key replacement are the same as shown in FIG. 4a or FIG. 4b.

Thus, the present invention has been disclosed in accordance with the preferred embodiments as described in conjunction with FIG. 1 through FIG. 4c. It will be understood by those skilled in the art that various changes can be made without departing from the scope of this invention, as taught in the foregoing description. For example, the key length that is used to generate a new key can be stored in the PSD, provided by the data center or computed from an algorithm based on the key length of the currently active key. Furthermore, the key generation algorithm can be changed to take advantage of the advances of computing as time progresses. Thus, the PSD can be adapted to receive a new key generation algorithm or software from the data center.

The embodiments disclosed hereinabove are for illustrative purposes only. Other embodiments of the present inven-

What is claimed is:

1. A postage security device, including a cryptographic key, for generating a digital token with a level of security, wherein the digital token is generated as proof of postage payment requested by a user who provides mailing parameters to the postage security device, and wherein the digital token is generated based on the provided mailing parameters in order to allow the user to produce an indicia on a mailpiece based on the digital token, said postage security device comprising:
   storage means for storing replacement keys;
   means for determining whether unused storage means for replacement keys is available and for reporting an error condition if unused storage means is not available;
   first means, responsive to a command for a key change, for providing a further cryptographic key to replace the cryptographic key; and
   second means, operatively connected to the first means, for generating a further digital token, based on the provided mailing parameters and the further cryptographic key, wherein the cryptographic key has a first key length and the further cryptographic key has a second key length, which is greater than the first key length, so as to improve the level of security associated with said postage security device.

2. The postage security device of claim 1, wherein the first means comprises means for generating the further cryptographic key within the postage security device.

3. The postage security device of claim 1, wherein the first means comprises means for acquiring the further cryptographic key from a source different from the postage security device.

4. The postage security device of claim 1, wherein the first means comprises a memory for storing a plurality of replacement cryptographic keys, so as to allow the further cryptographic key to be selected from the replacement cryptographic keys.

5. A cryptographic method of providing a level of security by a twin postage security device, which generates a digital token using a cryptographic key, wherein the digital token is generated based on mailing parameters provided by a user who makes a request to the postage security device for proof of postage payment, and wherein the digital token allows the user to produce an indicia on a mailpiece as proof of postage payment, said method comprising the steps of:
   sending a signal to the postage security device requesting a key change; and
   requesting a second signal indicating whether unused key storage space for replacement keys is available;
   providing a new cryptographic key, in response to the signal if the second signal indicates that storage pace is available, in order to generate further digital tokens upon request, wherein the replaced cryptographic key has a first key length and the new cryptographic key has a second key length, which is greater than the first length, so as to improve the security of the postage security device.

6. The method of claim 5, wherein the new cryptographic key is generated by the postage security device.

7. The method of claim 5, wherein the new cryptographic key is pre-stored in the postage security device.

8. The method of claim 5, further comprising the step of storing a plurality of different cryptographic keys in a storage device in order to allow the new cryptographic key to be selected from the different stored cryptographic keys.

9. The method of claim 5, wherein the signal includes the second key length for the new cryptographic key.

10. The method of claim 5, wherein the user provides mailing parameters to a data center, which is operatively connected to the postage security device, and wherein the signal is indicative of a command from a command from the data center.

11. The method of claim 5, wherein the cryptographic key is given a set time to be used as an active key of the postage security device, and wherein the signal indicates that the set time for the cryptographic key has expired and the new cryptographic key should be used as the active key.

12. A postage metering system to allow a user to produce an indicia on a mailpiece as proof of postage payment, said system comprising:
   a data center for receiving mailing parameters from the user and for providing data indicative of the mailing parameters;
   a postage security device, operatively connected to the data center, for receiving said data and for providing a token based on the mailing parameters and a cryptographic key and having storage means for storing replacement keys, and means for determining whether unused storage means for replacement keys is available and for reporting an error condition if unused storage means is not available; and
   means, operatively connected to the postage security device, for printing the indicia based on the token, wherein the postage security device is capable of replacing the cryptographic key with a new cryptographic key in response a signal requesting a key change, wherein the new cryptographic key has a second length, which is greater than the first key length, so as to improve the level of security of the postage metering system.

13. The postage metering system of claim 12, wherein the printing means includes a computer.

14. The postage metering system of claim 12, wherein the signal is provided by the data center.

15. The postage metering system of claim 12, wherein the cryptographic key is given a set time to be an active key for the postage security device, and wherein the signal indicates that the set time for the cryptographic key has expired and the new cryptographic key should be used as the active key.

16. The postage metering system of claim 12, wherein the new cryptographic key is generated by the postage security device.

17. The postage metering system of claim 12, further comprising a storage means, operatively connected to the postage security device, for storing a plurality of replacement keys, wherein the new cryptographic key is selected from the replacement keys by the postage security device.

18. The postage metering system of claim 12, wherein the data center includes an information storage for storing Information associated with the user, and wherein the data center, prior to providing the data, uses the stored information in the information storage to validate the user when the data center receives mailing parameters from the user.

19. The postage metering system of claim 18, wherein the data center further includes a vault to keep an account associated with the user, and wherein the data further checks the vault for account balance prior to providing the data.

* * * * *